United States Patent
Nylander

(10) Patent No.: US 9,301,192 B2
(45) Date of Patent: Mar. 29, 2016

(54) CONTROLLING TRANSMISSION CONTROL PROTOCOL DATA

(71) Applicant: Telefonaktiebolaget L M Ericsson (publ), Stockholm (SE)

(72) Inventor: Tomas Nylander, Värmdö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 14/447,382

(22) Filed: Jul. 30, 2014

(65) Prior Publication Data

US 2015/0043332 A1 Feb. 12, 2015

(30) Foreign Application Priority Data

Aug. 9, 2013 (EP) .................................... 13179944

(51) Int. Cl.
| | |
|---|---|
| *G01R 31/08* | (2006.01) |
| *H04W 28/02* | (2009.01) |
| *H04L 29/06* | (2006.01) |
| *H04L 12/26* | (2006.01) |
| *H04L 12/801* | (2013.01) |
| *H04W 24/02* | (2009.01) |
| *H04L 12/893* | (2013.01) |

(52) U.S. Cl.
CPC ..... *H04W 28/0236* (2013.01); *H04L 29/06095* (2013.01); *H04L 43/0829* (2013.01); *H04L 47/12* (2013.01); *H04W 24/02* (2013.01); *H04W 28/0289* (2013.01); *H04L 47/14* (2013.01); *H04L 47/193* (2013.01); *H04L 47/40* (2013.01); *H04W 28/0226* (2013.01); *H04W 28/0273* (2013.01)

(58) Field of Classification Search
None
See application file for complete search history.

(56) References Cited

U.S. PATENT DOCUMENTS

| | | | |
|---|---|---|---|
| 8,416,690 B2 * | 4/2013 | Zhao | H04L 47/10 370/234 |
| 8,724,467 B2 * | 5/2014 | Le Faucheur | H04L 47/11 370/235 |
| 2007/0076598 A1 * | 4/2007 | Atkinson | H04L 47/10 370/229 |
| 2008/0225795 A1 | 9/2008 | Sun et al. | |
| 2013/0114408 A1 | 5/2013 | Sastry et al. | |
| 2015/0124619 A1 * | 5/2015 | Bergamasco | H04L 47/10 370/236 |

OTHER PUBLICATIONS

European Search Report, EP Application No. 13179944.7, Jan. 24, 2014.

* cited by examiner

*Primary Examiner* — Duc C Ho
(74) *Attorney, Agent, or Firm* — Myers Bigel & Sibley, P.A.

(57) ABSTRACT

A method an apparatus for sending data to a User Equipment via a Radio Access Network node using the Transmission Control Protocol. A TCP node that sends TCP User Plane data to the UE receives a message originating from the RAN node. The message includes a congestion avoidance inhibitor relating to the UE. If the TCP node subsequently detects packet loss is detected between the TCP node and the UE, and the congestion avoidance inhibitor is present, then the TCP node will inhibit a congestion avoidance mechanism. This ensures that congestion avoidance mechanisms, which reduce transmission rate, are not initiated for temporary RAN events such as handover when there is no congestion in the network.

17 Claims, 5 Drawing Sheets

CONTROLLING TRANSMISSION CONTROL PROTOCOL DATA

CROSS REFERENCE TO RELATED APPLICATION

This application claims priority to European Patent Application No. 13179944.7, filed Aug. 9, 2013, the disclosure and content of which is incorporated herein by reference in its entirety as if set forth fully herein.

TECHNICAL FIELD

The present disclosure relates to the field of controlling Transmission Control Protocol data

BACKGROUND

The Transmission Control Protocol (TCP) is a protocol for transmitting data between points in a communication network. A key feature of TCP is its reliability, as it includes delivery validation mechanisms and error checking. TCP is typically used by Web browser applications for connecting with servers.

A TCP connection is established end-to end. For example, it may be established to send data from a TCP server to a client device. In this case, the TCP server will typically measure the Round Trip Time (RTT) for sending data to the client, and uses that information to establish an optimal transmission rate. Other factors may influence the transmission rate, such as the transmission window. The transmission window is a measure of how many packets can be outstanding without receiving an acknowledgement that they have been received.

As shown in FIG. 1, in order to address long RTTs, a TCP proxy can be introduced. This breaks the TCP connections into two legs, which shortens the RTT. In FIG. 1, a User Equipment (UE) 1 connects via a Radio Access Network (RAN) node to a network. In this example, the RAN node is an eNodeB (eNB) 2. TCP data is sent via a Serving Gateway (SGW) 3 and a Packet Data Network Gateway (PGW) 4 from a TCP proxy 5. One of the TCP connection legs is therefore between the TCP proxy 5 and the UE 1

The TCP proxy 5 also connects with as TCP server located in a service network or in the Internet 6. The other TCP connection leg is therefore between the TCP proxy 5 and the TCP server.

A feature of TCP is that it includes a congestion avoidance mechanism. Different types of congestion avoidance mechanisms can be used, but they essentially rely on reducing the transmission rate of data in the event that congestion is detected. This means that if congestion is experienced in part of the network, leading to packet loss or unacceptably long RTTs, then the transmission rate is reduced. This has the effect of reducing the congestion in the network and, in most cases, allowing the transmission rate to be gradually increased once more.

During congestion avoidance, the end-user's Quality of Experience (QoE) is reduced, because the transmission rate of data is reduced. It is therefore desirable to avoid having to use a congestion avoidance mechanism unless necessary.

SUMMARY

When a handover of a UE 1 from one Radio Access Network node to another is required, as shown in FIG. 1 where a handover of the UE 1 from one eNB 2 to a further eNB 7 is shown, some packet loss may occur. Efforts have been made to reduce packet loss on handover. For example, in a Long Term Evolution (LTE) network, a source eNB 2 forwards received packets to a target eNB 7 on an X2 connection between the eNBs. However, this does not work in every case. For example, a packet destined for the UE 1 might be in flight towards source eNB 2, but since buffers are empty in the source eNB 2, the switch to the new (target) eNB 7 is executed. A similar problem may occur for packets (such as acknowledgements) sent on the uplink from the UE towards a TCP proxy or server. Similar problems occur for handover using different Radio Access Technologies (RAT).

It has been realised that when data is sent using a TCP connection, the TCP congestion avoidance mechanisms are initiated on detection of packet loss regardless of the cause of the packet loss. This means that congestion avoidance mechanisms are initiated whether packet loss is caused by congestion or handover. In the case of congestion, then initiating a congestion avoidance mechanism is appropriate in order to take account of the congestion. However, in the case where packet loss is caused by mobility events such as handover, initiation of a congestion control mechanism may not be necessary but simply reduce the user's QoE.

According to a first aspect, there is provided a method of sending data to a User Equipment (UE) via a Radio Access Network (RAN) node using the Transmission Control Protocol (TCP). A TCP node that sends TCP user plane data to the UE receives a message originating from the RAN node. The message includes a congestion avoidance inhibitor relating to the UE. If the TCP node subsequently detects packet loss is detected between the TCP node and the UE, and the congestion avoidance inhibitor is present, then the TCP node will inhibit a congestion avoidance mechanism.

An advantage of this is that congestion avoidance mechanisms are not initiated when packet loss is due to a temporary event in the RAN such as a handover. The TCP node can therefore retransmit the lost packets, but does not reduce the transmission rate. This ensures that the RAN event does not have a negative impact on the users' Quality of Experience.

An optional example of a TCP node is a TCP proxy.

As described above, an optional example of an event is handover, and in this case the congestion avoidance inhibitor is received as a result of the UE being involved in a handover to a further RAN node.

The congestion avoidance inhibitor is optionally received using a dedicated connection. Alternatively, the congestion avoidance inhibitor is optionally included in User Plane data sent between the RAN node and the TCP node. As a further alternative, the congestion avoidance inhibitor is included in a packet header.

The TCP node is optionally located between the RAN node (2) and a Network Translation Function.

The TCP node optionally subsequently deletes the congestion avoidance inhibitor. An advantage of this is that congestion avoidance can be started again in the event that subsequent packet loss occurs that is related to congestion, and not to a temporary event in the RAN such as handover. As a further option, the congestion avoidance inhibitor is deleted after the expiry of a predetermined time, or after receiving a message instructing the TCP node to delete the congestion control inhibitor. This message may come from any suitable node, such as a target RAN node once handover is complete.

According to a second aspect, there is provided a method of controlling a flow of TCP data from a TCP node to a UE via a RAN node. A RAN node determines that a handover of the UE to a further RAN node is required. As a result, it sends a message towards the TCP node. The message includes a congestion avoidance inhibitor, the congestion avoidance inhibitor instructing the TCP node to inhibit a congestion avoidance mechanism in the event hat packet loss is detected. An advantage of this is that the RAN node can inform the TCP node when a temporary event such as handover may lead to packet loss for reasons other than congestion in the network, and so the TCP node need not initiate a congestion avoidance mechanism if it detects packet loss. This ensures that the user's Quality of Experience is not reduced in the event that handover occurs.

As an option, the TCP node is a TCP proxy.

The congestion avoidance inhibitor is optionally sent by any of using a dedicated connection, including the congestion avoidance inhibitor in User Plane data sent between the RAN node and the TCP node, or including the congestion avoidance inhibitor in a packet header.

As an option, the message includes a time value indicating a time after which the TCP node must delete the congestion avoidance inhibitor.

According to a third aspect, there is provided a TCP node for sending data to a UE via a RAN node using the TCP. The TCP node is provided with a transmitter arranged to send TCP User Plane data to the UE. A receiver is provided for receiving a message originating from the RAN node, the message including a congestion avoidance inhibitor relating to the UE. A memory is provided for storing the congestion avoidance inhibitor. A processor is also provided, which is arranged to detect packet loss between the TCP node and the UE. The processor is further arranged to determine the presence of the congestion avoidance inhibitor in the memory and, as a result, inhibit a congestion avoidance mechanism.

An optional example of a TCP node is a TCP proxy.

The receiver is optionally arranged to receive the congestion avoidance inhibitor using any of a dedicated connection, a congestion avoidance inhibitor included in User Plane data sent between the RAN node and the TCP node, or a congestion avoidance inhibitor included in an existing packet header.

According to a fourth aspect, there is provided a RAN node for use in a communication network. The RAN node is provided with a processor for determining that a handover of a UE currently attached to the RAN node to a further RAN node is required. A transmitter is also provided, which is arranged to send towards a TCP node a message. The message includes a congestion avoidance inhibitor, the congestion avoidance inhibitor instructing the TCP node to inhibit a congestion avoidance mechanism in the event that packet loss is detected between the UE and the TCP node.

As an option, the transmitter is arranged to send the congestion avoidance inhibitor by using any of a dedicated connection, including the congestion avoidance inhibitor in User Plane data sent between the RAN node and the TCP node, and including the congestion avoidance inhibitor in an existing packet header.

An optional example of a RAN node is an eNodeB.

According to a fifth aspect, there is provided a computer program comprising computer readable code which, when run on a TCP node causes the TCP node to perform the method as described above in the first aspect.

According to a sixth aspect, there is provided a computer program comprising computer readable code which, when run on an RAN node, causes the RAN node to perform the method as described above in the second aspect.

According to a seventh aspect, there is provided a computer program product comprising a non-transitory computer readable medium and a computer program as described above in either of the fifth or sixth aspects, wherein the computer program is stored on the non-transitory computer readable medium.

According to an eighth aspect, there is provided a vessel or vehicle comprising any of a TCP node described in the third aspect or a RAN node described in the fourth aspect

DETAILED DESCRIPTION

Whenever packet loss is detected, existing TCP mechanisms will typically initiate a congestion avoidance mechanism (assuming the amount of packet loss is sufficiently high). However, as described above, in some cases it may not be appropriate to initiate a congestion avoidance mechanism. For example, packet loss may be caused by a mobility event such as handover of a UE from one RAN node to another. Other temporary issues in the RAN may give rise to packet loss, but it may not be necessary to implement a congestion avoidance mechanism.

Figure 1:
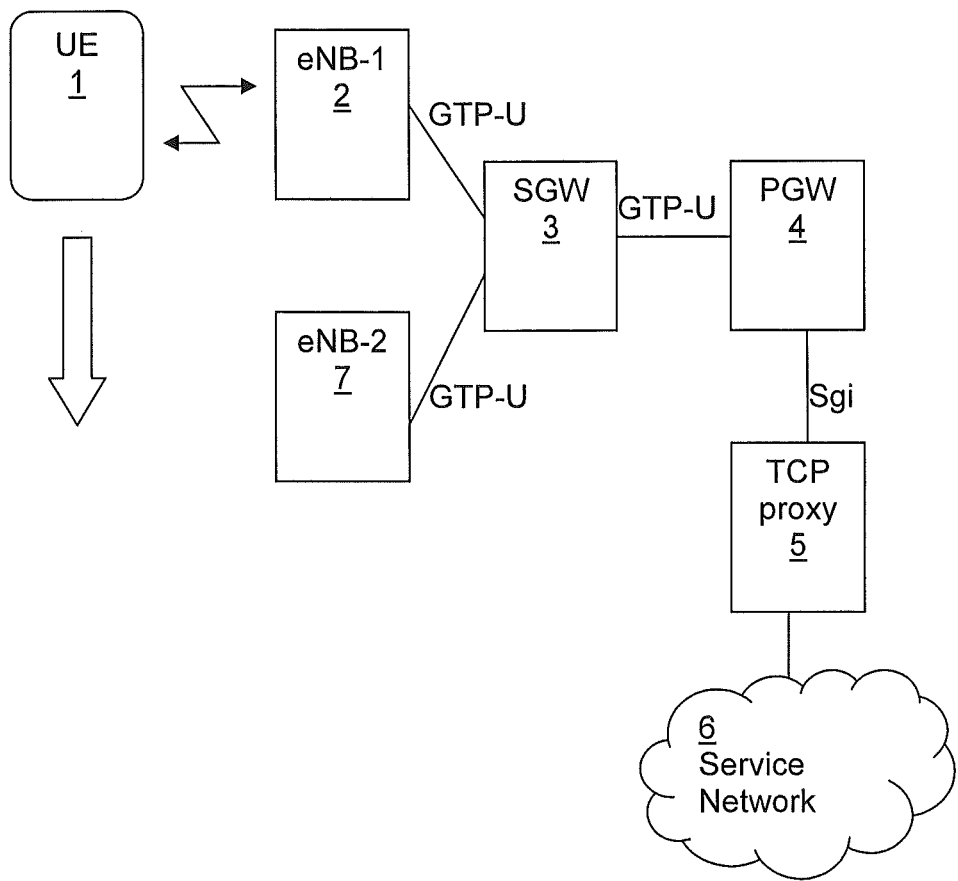
FIG. 1 illustrates schematically in a block diagram a known communication network.
Figure 2:
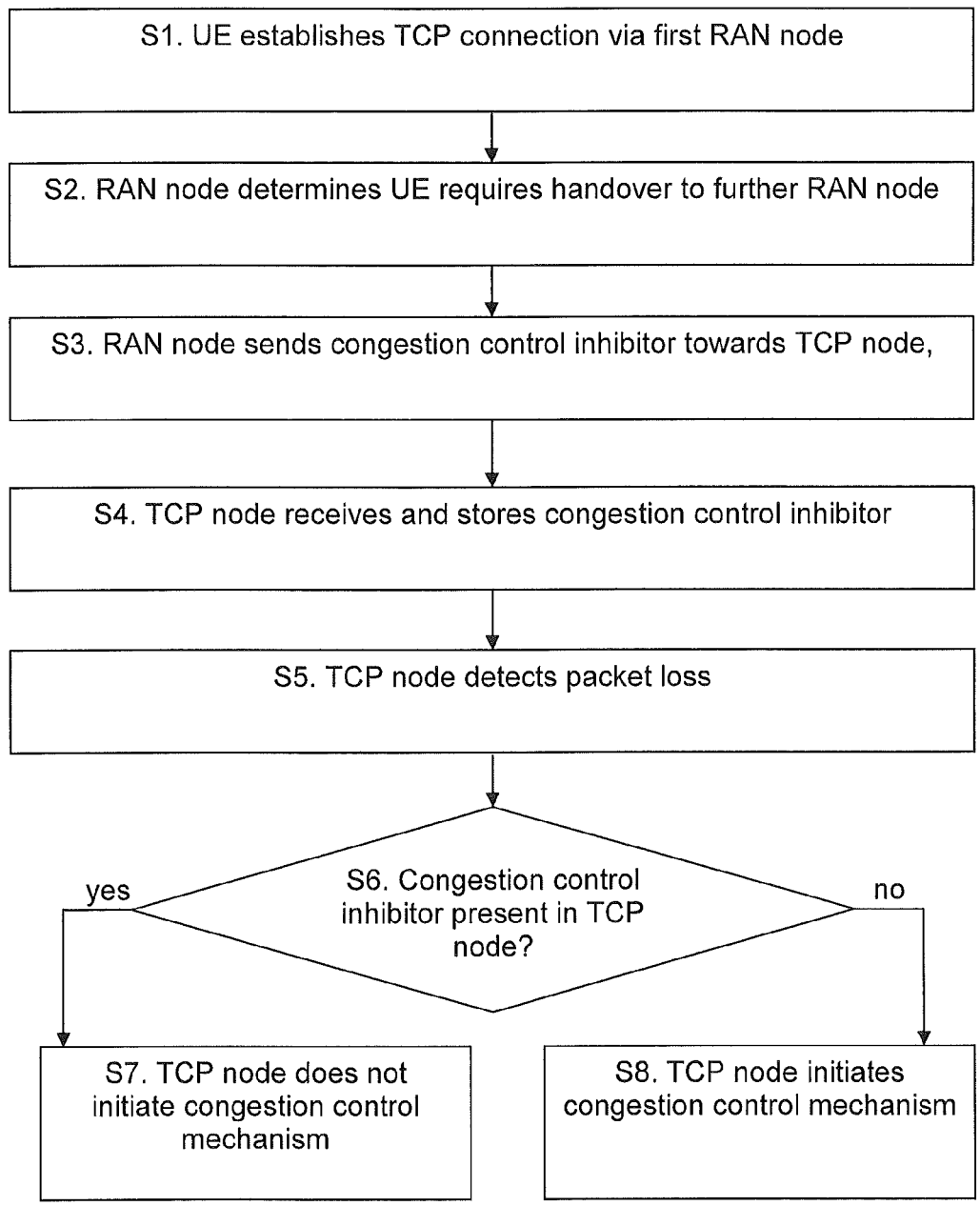
FIG. 2 is a flow diagram illustrating exemplary steps.

In order to address this, a RAN node informs the TCP node that it should not initiate a congestion avoidance mechanism. This is achieved by the RAN node sending a message containing a congestion avoidance inhibitor towards the TCP node. FIG. 2 is a flow diagram illustrating exemplary steps using the type of network shown in FIG. 1. The following numbering corresponds to that of FIG. 2:

S1. The UE 1 establishes a TCP connection via a first eNB 2 with a TCP proxy 5. Note that this is by way of example, and the UE 1 may in some circumstances have a direct connection with the TCP server located in the service network 6. However, in a typical scenario, a TCP proxy 5 is used. Note also that an eNB is used as an example of a RAN node, and any other suitable RAN node in a different RAT may be used. Note that the same problem may occur in Wireless Local Area Networks (WLAN) having an Access Point (AP) that a UE can attach to. Packet loss may occur when a UE moves from one AP to another. The terms RAT and RAN should therefore be construed as including WLAN as well as other types of access network.

S2. The eNB 2 determines that the UE 1 must perform a handover to a further eNB 7.

S3. The first eNB 2 is aware that the UE 1 is about to handover to the further eNB 7, and so it sends a congestion control inhibitor towards the TCP proxy 5.

S4. The TCP proxy 5 receives and stores the congestion control inhibitor. The congestion control inhibitor is associated with the UE 1.

S5. The TCP proxy 5 subsequently detects packet loss.

S6. Under normal circumstances, the TCP proxy 5 would initiate a congestion avoidance mechanism in the event that packet loss is detected. However, it determines whether a congestion avoidance inhibitor is associated with the UE 1 for which packet loss has been detected.

S7. In the event that a congestion avoidance inhibitor is associated with the UE 1 for which packet loss has been detected, the TCP proxy 5 does not initiate a congestion avoidance mechanism.

S8. In the event that no congestion avoidance inhibitor is associated with the UE 1 for which packet loss has been detected, the TCP proxy 5 initiates a congestion avoidance mechanism, as the packet loss is most likely due to congestion at some point in the network.

Note that at some point after the temporary RAN conditions are over, the congestion avoidance inhibitor may no longer be required. For example, once handover from the source eNB 2 to the target eNB 7 is complete, then further packet loss is likely to be due to congestion. In this case it would be appropriate for the TCP proxy 5 to initiate a congestion avoidance mechanism in the event that packet loss is detected. There are various ways that this can be address. A first example is to give the congestion avoidance inhibitor a lifetime, so that after it has been stored for a pre-determined period of time, it is deleted from the TCP proxy 5. The predetermined time should be selected according to how long the handover is expected to take. A second example is for the target eNB 7 to send a second message to the TCP proxy 5 once handover is complete, the second message instructing the TCP proxy 5 to delete the congestion avoidance inhibitor. A further example is for a Service Aware node (described below) to instruct the TCP proxy 5 to delete the congestion avoidance inhibitor.

Figure 3:
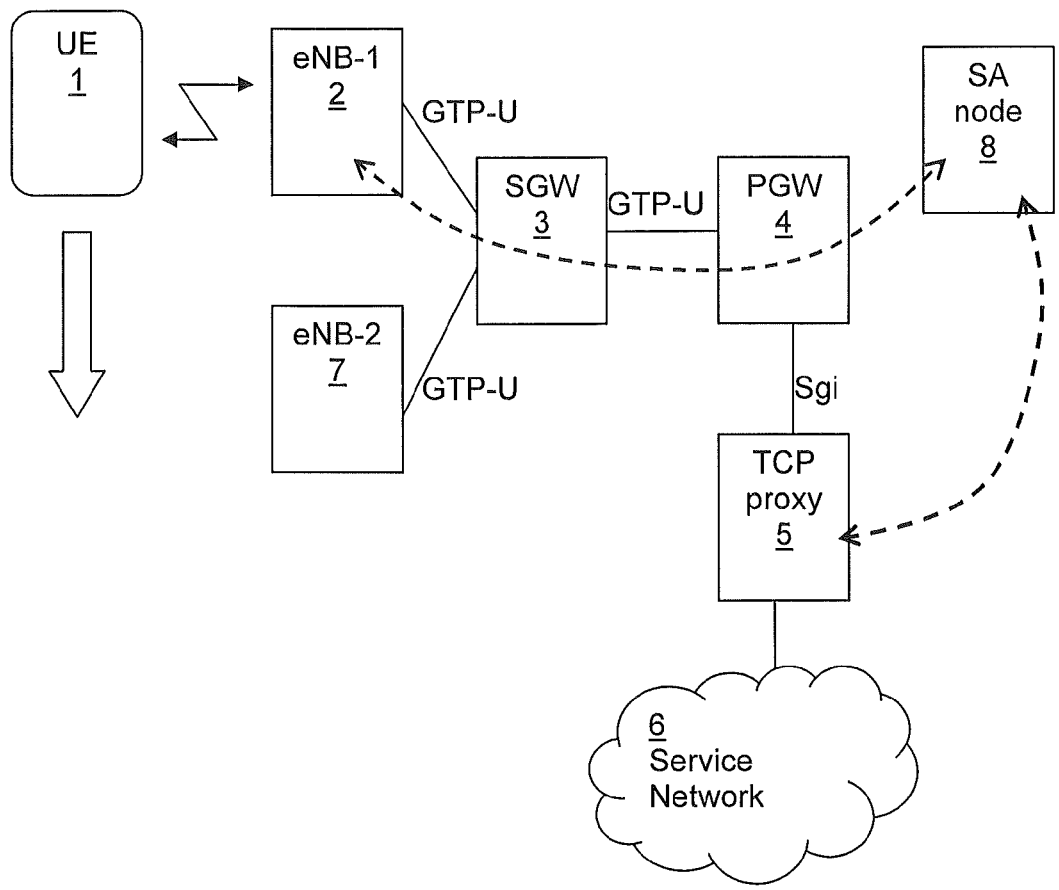
FIG. 3 illustrates schematically in a block diagram an exemplary communication network and signal flow.

There are various mechanisms by which the TCP proxy 5 can be sent a congestion avoidance inhibitor and instructions to delete the congestion avoidance inhibitor. FIG. 3 shows an exemplary network in which a Service Aware (SA) node 8 is used to send signalling between RAN nodes and nodes in the service network 6. An SA node 8 may, for example, inform a service node such as a TCP server of conditions in the RAN, allowing the TCP server to adjust the quality of the media that is being sent. Similarly, it might inform a node in the RAN of the type of amount of data it can expect to receive from the service node, allowing the RAN node to reserve resources. Note that in the example of FIG. 3, the SA node 8 and the TCP proxy 5 may be located at the same physical node.

Figure 4:
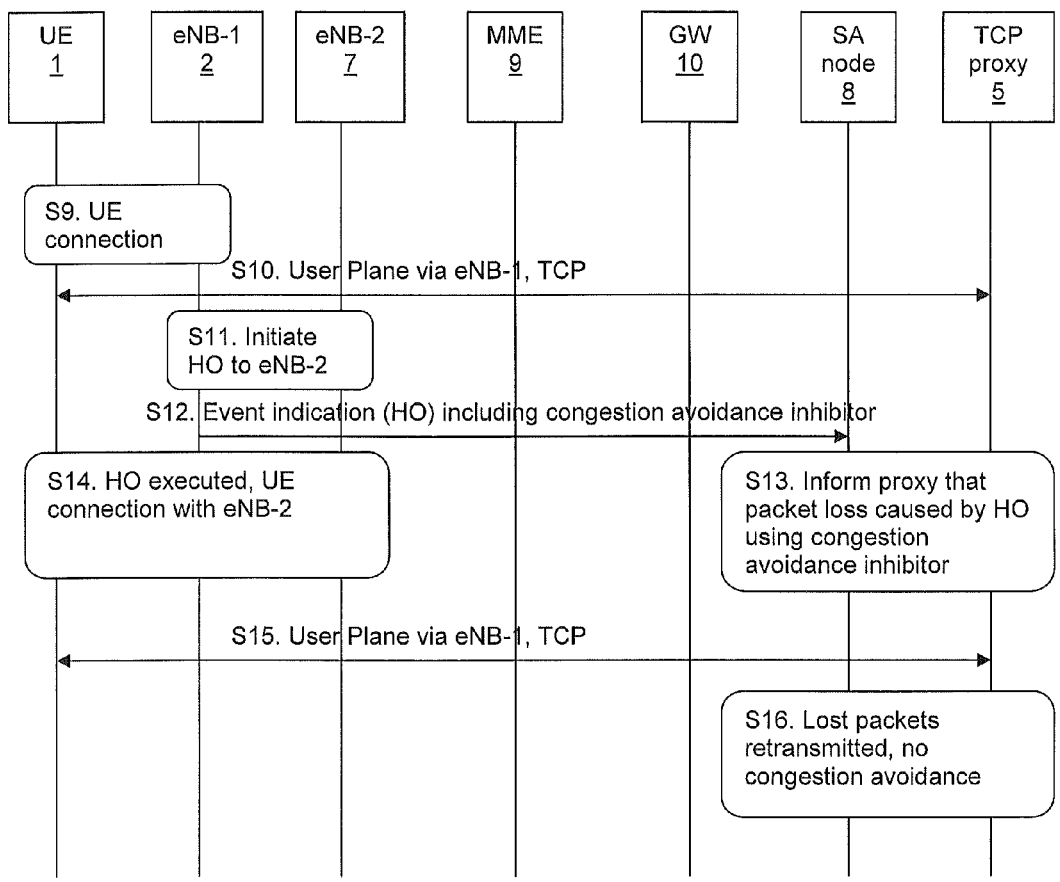
FIG. 4 is a signalling diagram showing an exemplary procedure for a UE handover.

FIG. 4 is a signalling diagram showing exemplary signalling when the UE 1 is subjected to a handover from one eNB 2 to a further eNB 7. In this example, signalling from the eNBs 2, 7 is sent to the SA node 8. A Mobility Management Entity (MME) and a Gateway (GW) 10 are also shown, but if the signalling is sent on the user plane then these entities will not be involved. In some circumstances, some signalling may be sent via the GW 10. The following numbering corresponds to that of FIG. 4:

S9. The UE attaches to the eNB 2.

S10. User Plane data traffic is sent from the TCP proxy 5 to the UE 1 via the eNB 2 using TCP.

S11. A handover of the UE 1 from the eNB 2 to a further eNB 7 is initiated.

S12. An event indication is sent from the eNB 2 towards the SA node 8. This informs the SA node that a handover is taking place.

S13. The SA node 8 sends a congestion avoidance inhibitor to the TCP proxy 5. The TCP proxy 5 stores the congestion avoidance inhibitor. Note that the congestion avoidance inhibitor may include a lifetime during which it will be active at the TCP proxy 5.

S14. At the same time as step S12, handover of the UE 1 from the eNB 2 to the further eNB 7 occurs, and the UE attaches to the further eNB 7. Once the handover to the further eNB 7 has occurred, the congestion avoidance inhibitor can be deleted at the TCP proxy 5. As described herein, there are various mechanisms to ensure that the congestion avoidance inhibitor is not deleted until handover is complete.

S15. User Plane data traffic is sent from the TCP proxy 5 to the UE 1 via the further eNB 7 using TCP.

S16. In the event that packet loss is detected, the TCP proxy 5 determines the presence of the congestion avoidance inhibitor associated with the UE 1 and retransmits lost packets, but does not initiate a congestion avoidance mechanism.

As described above, the congestion avoidance inhibitor may have a predetermined lifetime, or the further eNB 7 may instruct the TCP proxy 5 via the SA node 8 to delete the congestion avoidance inhibitor associated with the UE 1.

Note that while FIGS. 3 and 4 show communication between the eNB 2 and the TCP proxy 5 via the SA node 8, the communication of the congestion avoidance inhibitor may be sent directly from the eNB 2 to the TCP proxy 5.

There are various signalling techniques that can be used to send the congestion avoidance inhibitor from the eNB 2.

In a first example, a new protocol is provided between the RAN and the TCP proxy 5 using a dedicated outband signalling connection.

In a second example, a new protocol is provided between the RAN and the TCP proxy 5. The congestion avoidance inhibitor is inserted on the actual user plane flow.

In a third example, a new protocol is provided that uses existing unused flags and bits in the IP and TCP headers, for example using the IP options in the IP header.

In a typical mobile network, the operator will provide a Network Address Translation (NAT) function on the borders between the mobile network and the Internet to be able to reuse IP addresses. This leads to complications if the TCP server is located outside the NAT function, because the UE IP address is changed to the NAT's IP address for the payload. There is therefore no common identifier for the UE 1 and session between the RAN and the TCP server. The only option to signal between the RAN and the TCP server in this scenario is to modify the user payload according to the third example above, by using IP options in the IP header, or some flags in the TCP header. This solution may require additional changes, such as recalculation of packet checksums and so on.

In the event that a NAT function is not used, or if the TCP server is between a NAT and the UE 1, or if IP version 6 is used, then the second example can be used. In other words, the congestion avoidance inhibitor is transported inband by inserting packets on the user plane path. Alternatively, this protocol could be transported outband on dedicated signalling paths. Note that in most circumstances, a TCP proxy 5 will be between a NAT and the UE 1

The above description refers to eNBs 2, 7 and a TCP proxy 5. It will be appreciated that any RAN node can be used to signal the congestion avoidance inhibitor, and that the TCP proxy may alternatively be a TCP server where no TCP proxy is used.

Figure 5:
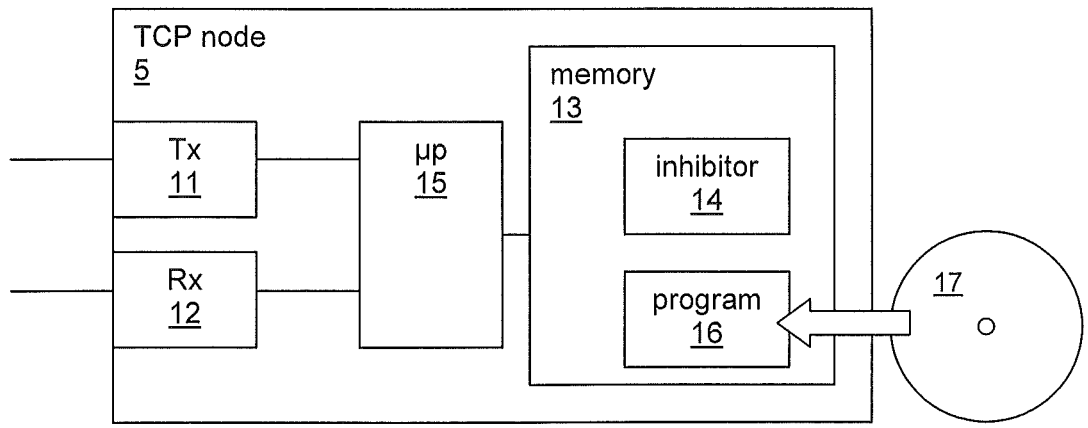
FIG. 5 illustrates schematically in a block diagram an exemplary TCP node.

FIG. 5 illustrates schematically in a block diagram a TCP node such as the TCP proxy 5 discussed above. Note that the node could alternatively be a TCP server where no TCP proxy is used. In this example, the node is referred to as a TCP proxy 5. The TCP proxy 5 is provided with a transmitter 11 for sending TCP User Plane data to the UE 1. A receiver 12 is provided, for receiving a message originating from the RAN node (the eNB 2 in the examples above). The message includes a congestion avoidance inhibitor relating to the UE. A non-transitory computer readable medium in the form of a memory is provided for storing the congestion avoidance inhibitor 14. A processor 15 is also provided. The processor

15 is arranged to detect packet loss between the TCP proxy 5 and the UE 1. If packet loss is detected, the processor 15 is arranged to determine the presence of the congestion avoidance inhibitor in the memory 13 and, as a result, inhibit a TCP congestion avoidance mechanism.

Note that the memory 13 may also be used to store a computer program 16 which, when executed by the processor 15, causes the TCP proxy 5 to behave as described above. Note also that the computer program may be provided on an external non-transitory computer readable medium 17, such as a Compact Disk or a flash drive.

Figure 6:
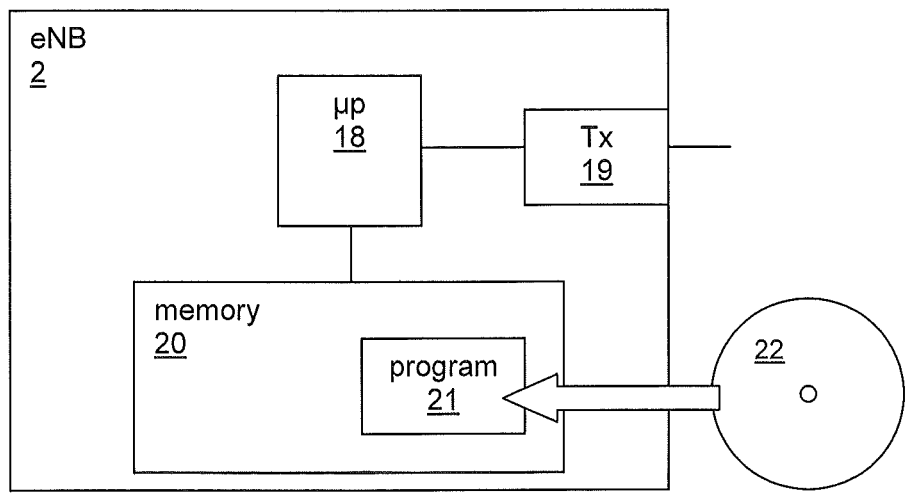
FIG. 6 illustrates schematically in a block diagram an exemplary Radio Access Network node.

FIG. 6 illustrates schematically in a block diagram a RAN node such as the eNB 2 discussed above. While the invention may be implemented using any type of RAT, the following description uses an example where the RAN node is the eNB 2. The eNB 2 is provided with a processor 18 for determining that handover of the UE is required. A transmitter 19 is also provided for sending a message towards the TCP proxy 5. The message includes a congestion avoidance inhibitor, which instructs the TCP proxy 5 to inhibit a congestion avoidance mechanism in the event that packet loss is detected between the UE 1 and the TCP proxy 5.

A non-transitory computer readable medium in the form of a memory 20 is also provided. The memory 20 may be used to store a computer program which, when executed by the processor 18, causes the eNB 2 to behave as described above. Note also that the computer program may be provided on an external non-transitory computer readable medium 22, such as a Compact Disk or a flash drive.

Figure 7:
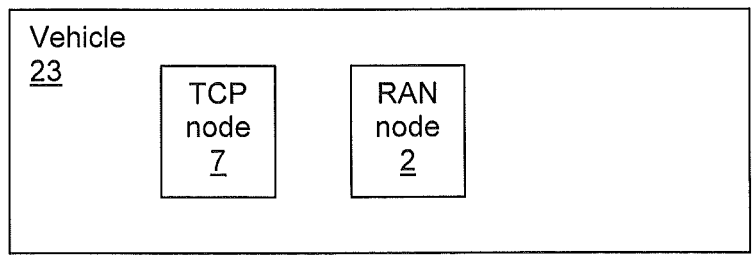
FIG. 7 illustrates schematically in a block diagram an exemplary vessel or vehicle.

Turning now to FIG. 7, there is illustrated a vessel or vehicle 23, such as a ship, a train, a car, an aeroplane, a truck and so on. The vessel or vehicle 23 is provided with any of a TCP node 5 as described above and a RAN node 2 as described above.

The techniques and apparatus described above improve a user's QoE because a congestion avoidance mechanism is inhibited in the event that the TCP server or TCP proxy is provided with a congestion avoidance inhibitor. This is used where a temporary issue in the RAN, such as a mobility event, could lead to packet loss, but this packet loss does not require a congestion avoidance mechanism to reduce the transmission rate. The TCP node therefore re-transmits any lost packets but, if the congestion avoidance inhibitor is present and associated with the UE, does not initiate a congestion avoidance mechanism. This ensures that a user's QoE is not negatively affected by events such as handover.

The skilled person will appreciate that various modifications may be made to the above described embodiments without departing from the scope of the present invention as defined in the appended claims. For example, while the invention is described in the context of an LTE network using eNBs, it will be appreciated that the same techniques could be used in an access network that uses any type of RAT. Similarly, it will be appreciated that the techniques described above can be used to inhibit congestion avoidance mechanisms from either a TCP proxy or a TCP server.

The following abbreviations have been used in the above description:
AP Access Point
eNB eNodeB
GW Gateway
LTE Long Term Evolution
MME Mobility Management Entity
NAT Network Address Translation
PGW Packet Data Network Gateway
QoE Quality of Experience
RAN Radio Access Network
RAT Radio Access Technologies
RTT Round Trip Time
SA Service Aware
SGW Serving Gateway
TCP Transmission Control Protocol
UE User Equipment
WLAN Wireless Local Area Networks ( ) having an

The invention claimed is:

1. A method of sending data to a User Equipment via a Radio Access Network node using the Transmission Control Protocol, TCP, the method comprising:
    at a TCP node sending TCP User Plane data to the User Equipment, receiving a message originating from the Radio Access Network node, the message including a congestion avoidance inhibitor relating to the User Equipment; and
    in the event that packet loss is detected between the TCP node and the User Equipment, determining the presence of the congestion avoidance inhibitor and, as a result, inhibit operation of a congestion avoidance mechanism.

2. The method according to claim 1, wherein the TCP node is a TCP proxy.

3. The method according to claim 1, wherein the congestion avoidance inhibitor is received as a result of the User Equipment being involved in a handover to a further Radio Access Network node.

4. The method according to claim 1, wherein the congestion avoidance inhibitor is received by any of:
    using a dedicated connection;
    including the congestion avoidance inhibitor in User Plane data sent between the Radio Access Network node and the TCP node; and
    including the congestion avoidance inhibitor in a packet header.

5. The method according to claim 1, wherein the TCP node is located between the Radio Access Network node and a Network Translation Function.

6. The method according to claim 5, further comprising, at the TCP node, subsequently deleting the congestion avoidance inhibitor.

7. The method according to claim 6, wherein the congestion avoidance inhibitor is deleted after any of the expiry of a predetermined time, and receiving a message instructing the TCP node to delete the congestion control inhibitor.

8. A method of controlling a flow of Transmission Control Protocol, TCP, data from a TCP node to a User Equipment via a Radio Access Network node, the method comprising, at the Radio Access Network node:
    determining that a handover of the User Equipment to a further Radio Access Network node is required; the method characterize by
    sending towards the TCP node a message, the message including a congestion avoidance inhibitor, the congestion avoidance inhibitor instructing the TCP node to inhibit operation of a congestion avoidance mechanism in the event that packet loss is detected.

9. The method according to claim 8, wherein the congestion avoidance inhibitor is sent by any of:
    using a dedicated connection;
    including the congestion avoidance inhibitor in User Plane data sent between the Radio Access Network node and the TCP node; and
    including the congestion avoidance inhibitor in a packet header.

10. The method according to claim 8, wherein the message includes a time value indicating a time after which the TCP node must delete the congestion avoidance inhibitor.

11. A Transmission Control Protocol, TCP, node for sending data to a User Equipment via a Radio Access Network node using the TCP, the TCP node comprising:
a transmitter arranged to send TCP User Plane data to the User Equipment, the TCP node comprising:
a receiver arranged to receive a message originating from the Radio Access Network node, the message including a congestion avoidance inhibitor relating to the User Equipment;
a memory arranged to store the congestion avoidance inhibitor;
a processor arranged to detect packet loss between the TCP node and the User Equipment, the processor being further arranged to determine the presence of the congestion avoidance inhibitor in the memory and, as a result, inhibit operation of a congestion avoidance mechanism.

12. The TCP node according to claim 11, wherein the TCP node is a TCP proxy.

13. The TCP node according to claim 11, wherein the receiver is arranged to receive the congestion avoidance inhibitor using any of a dedicated connection, a congestion avoidance inhibitor included in User Plane data sent between the Radio Access Network node and the TCP node, and a congestion avoidance inhibitor included in an packet header.

14. A Radio Access Network node for use in a communication network, the Radio Access Network node comprising:
a processor for determining that a handover of a User Equipment currently attached to the Radio Access Network node to a further Radio Access Network node is required; the Radio Access Network node comprising:
a transmitter arranged to send towards a TCP node a message, the message including a congestion avoidance inhibitor, the congestion avoidance inhibitor instructing the TCP node to inhibit operation of a congestion avoidance mechanism in the event that packet loss is detected between the User Equipment and the TCP node.

15. The Radio Access Network node according to claim 14, wherein the transmitter is arranged to send the congestion avoidance inhibitor by using any of a dedicated connection, including the congestion avoidance inhibitor in User Plane data sent between the Radio Access Network node and the TCP node, and including the congestion avoidance inhibitor in an packet header.

16. A non-transitory computer-readable medium storing computer readable code which, when run on a TCP node causes the TCP node to perform the method as claimed in claim 1.

17. A computer program comprising computer readable code on a non-transitory computer readable medium, the computer readable code, when run on an Radio Access Network node, causes the Radio Access Network node to perform the method as claimed in claim 8.

* * * * *